United States Patent [19]

Zervos

[11] Patent Number: 4,556,169
[45] Date of Patent: Dec. 3, 1985

[54] ON-OFF THERMOSTAT BASED MODULATING AIR FLOW CONTROLLER

[75] Inventor: Daniel H. Zervos, Crestwood, Ill.

[73] Assignee: Honeywell Inc., Minneapolis, Minn.

[21] Appl. No.: 618,280

[22] Filed: Jun. 7, 1984

[51] Int. Cl.[4] .......................................... F24F 13/10
[52] U.S. Cl. ...................................... 236/49; 236/84; 251/129.11; 251/129.12; 318/159
[58] Field of Search ............... 236/49, 84; 318/159, 318/160; 251/133, 134

[56] References Cited

U.S. PATENT DOCUMENTS

| | | | |
|---|---|---|---|
| 1,564,804 | 12/1925 | Warren | 318/160 X |
| 1,979,690 | 11/1934 | Ingersoll | 318/160 X |
| 2,052,947 | 9/1936 | Shivers | 318/160 X |
| 2,496,409 | 2/1950 | Ratazak | 318/160 X |
| 2,502,830 | 4/1950 | Crise | 318/160 X |
| 2,662,547 | 12/1953 | Comeau | 251/133 X |
| 2,731,974 | 1/1956 | Krueger | 137/80 |
| 2,919,859 | 1/1960 | Krueger | 236/1 |
| 2,991,937 | 7/1961 | Bottorf et al. | 236/13 |
| 3,384,800 | 5/1968 | Norris et al. | 318/160 X |
| 3,690,548 | 9/1972 | McNabney | 236/49 X |
| 3,941,310 | 3/1976 | Travaglio et al. | 236/49 |
| 4,077,567 | 3/1978 | Ginn et al. | 236/49 |
| 4,147,298 | 4/1979 | Leemhuis | 236/49 |
| 4,174,065 | 11/1979 | Knauth | 236/49 |
| 4,196,326 | 4/1980 | Vogler et al. | 200/81 R |
| 4,270,694 | 6/1981 | Knauth | 236/49 |

*Primary Examiner*—William E. Tapolcai
*Attorney, Agent, or Firm*—Trevor B. Joike

[57] ABSTRACT

A system for providing modulated air flow control in response to an on-off thermostat having an on-off thermostat, a self-returning, slow moving motor connected to the thermostat for moving in a first direction when the thermostat is on and moving in a second direction when the thermostat is off, a damper motor adapted to drive a damper, and a controller driven by the self-returning, slow moving motor and connected to the damper motor for modulating air flow in response to the on-off thermostat.

18 Claims, 5 Drawing Figures

ON-OFF THERMOSTAT BASED MODULATING AIR FLOW CONTROLLER

BACKGROUND OF THE INVENTION

The present invention relates to a modulating air flow controller and, more particularly, to a controller which yields the advantages of a proportional control system even though the input sensor is an on-off thermostat.

Traditionally, on-off control systems have had the advantage of fast response times and inexpensive construction. However, such control systems because of their fast response times tend to overshoot the control point which causes unstable control action. Proportional control systems were developed to provide stable control but are relatively more expensive to construct and result in slower response times in order to increase stability.

The present invention incorporates many of the advantages of both types of systems in a variable air volume setting in which proportional control is simulated in order to modulate the flow of air moving through an air supply duct in response to a simple on-off thermostat. Such a system does not require more complex proportional thermostats (i.e. thermostats having an output which is proportional to temperature deviation from a setpoint) and associated control circuitry and does not have the instability problems of on-off control systems.

SUMMARY OF THE INVENTION

Accordingly, the present invention relates to a controller for providing modulated air flow control for the air moving through a duct in response to an on-off thermostat having an on-off thermostat, a self-returning, slow motor connected to the thermostat for being driven in a first direction when the thermostat is on and in a second direction when the thermostat is off, a damper motor which is adapted to drive a damper, and a controller driven by the self-returning, slow motor and connected to the damper motor for modulating the air flow in the duct in response to the on-off thermostat.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
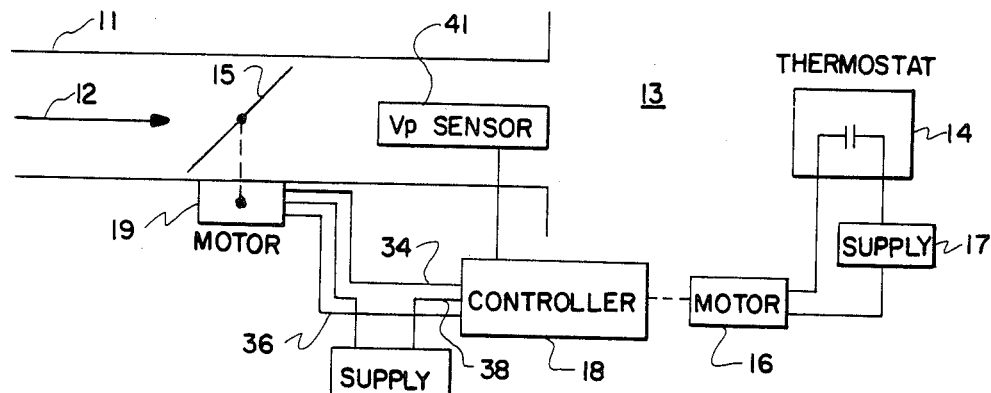
FIG. 1 shows the air flow control system according to the invention.

In FIG. 1, air moves through duct 11 in the direction of arrow 12. This air, for example, is supplied to space 13 the temperature of which is to be controlled by thermostat 14. Thermostat 14 will control the position of damper 15 for regulating the amount of air 12 being supplied to space 13 for controlling the temperature thereof. The typical system may be direct acting such that when the thermostat makes, the damper 15 is driven to an open position allowing more air to flow into space 13. For example, in a heating application, when the temperature drops to a predetermined point, thermostat 14 will close driving damper 15 to a more open position to supply additional heated air to space 13 for raising the temperature therein. Thermostat 14 may preferably be a thermostat with heating and/or cooling anticipation.

Thermostat 14 is connected to motor 16 and power supply 17 such that when thermostat 14 closes, motor 16 is electrically driven by supply 17 and, when thermostat 14 opens, self-returning, slow moving motor 16 is deenergized from power supply 17. When motor 16 is deenergized, it begins returning to its home position.

Motor 16 may, for example, be an M833 bimetal motor manufactured by Honeywell Inc. This motor is a very slow actuator capable of rotating a cam through 90° in approximately 18 minutes. Motor 16 operates in a low velocity mode in either of its directions.

Motor 16 drives controller 18 for in turn driving damper motor 19 for adjusting the position of damper 15 in response to controller 18.

Figure 2:
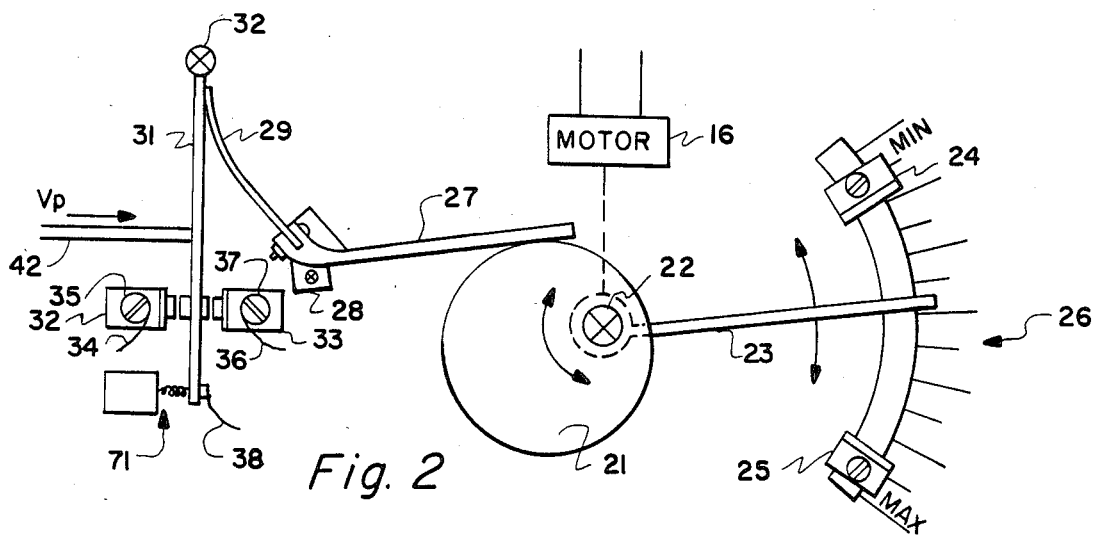
FIG. 2 shows the details of the controller shown in FIG. 1.

Controller 18 is shown in more detail in FIG. 2. Motor 16 drives cam 21 about its pivot point 22. As cam 21 rotates, lever 23 affixed thereto also rotates in the direction of the arrows. Minimum limit 24 and maximim limit 25 cooperate with scale 26 and with lever arm 23 for limiting the travel of cam 21 to in turn limit the air flow reset range, i.e. the amount of reset action exerted on damper 15 by thermostat 14. When lever arm 23 hits one of the stops 24 or 25, motor travel is stalled for limiting air flow reset range action.

Cam follower 27 pivots about pivot point 28 in response to rotation of cam 21 for exerting a force on leaf spring 29 which is affixed to movable contact 31 which pivots about pivot point 32.

From the position shown in FIG. 2, rotation of cam 21 in a clockwise direction rotates cam follower 27 about pivot point 28 in a counterclockwise direction for driving movable contact 31 about pivot 32 in a clockwise direction. On the other hand, from the position shown in FIG. 2, rotation of cam 21 in a counterclockwise direction causes cam follower 27 to rotate about pivot 28 in a clockwise direction for rotating movable contact 31 about pivot 32 in a counterclockwise direction.

Stationary contacts 32 and 33 sense movement of movable contact 31. Stationary contact 32 is connected to lead wire 34 by screw terminal 35 and stationary contact 33 is connected to lead wire 36 by screw terminal 37. Lead wire 38 is connected to movable contact 31. These lead wires are shown in FIG. 1.

As the temperature within space 13 falls to a predetermined point, thermostat 14 closes energizing motor 16. Motor 16 will then rotate cam 21 in a clockwise direction which rotates cam follower 27 in a counterclockwise direction for rotating movable contact 31 in a clockwise direction. A circuit is established between lead wires 34 and 38 to energize motor 19 for driving damper 15 to a more open position for supplying more heated air to zone 13 for raising the temperature therein. Velocity pressure sensor 41 senses the increased air flow within duct 11 and exerts a rebalancing force through lever arm 42 shown in FIG. 2 to drive contact 31 away from stationary contact 32. With this increased air flow and considering the very slow rotation rate of motor 16, if thermostat 14 is still not satisfied, cam 21 continues to rotate which will again drive movable contact 31 against stationary contact 32. Damper 15 is opened more which increases the air flow through duct 11 which increases the force exerted on movable contact 31 through linkage 42 by velocity pressure sensor 41. Again, contacts 31 and 32 open to deenergize motor 19. If at this point thermostat 14 becomes satisfied, its contacts open. When the contacts of thermostat 14 open, motor 15 is deenergized. Because motor 16 is a self-returning motor, cam 21 will begin rotating in a counterclockwise direction which will tend to bias movable element 31 away from stationary contact 32 and towards stationary contact 33. Because motor 16 is a very slow moving motor, movable contact 31 will move very slowly towards stationary contact 33. When and if movable contact 31 reaches stationary contact 33, motor 19 is energized to drive damper 15 in a closing direction for reducing the air flow moving through duct 11.

Because motor 16 is slow, controller 18 will result in stable air flow control. The system will seek to establish a relatively steady flow of air through duct 11 to maintain the predetermined temperature within space 13.

Thermostat 14 is a simple on-off thermostat which, although itself not a proportional thermostat, will result in proportional-like control as a result of the use of a self-returning, slow acting motor 16 in conjunction with the controller 18.

Figure 3:
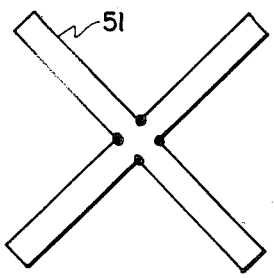
FIGS. 3 and 4 show a target which can be used within the duct shown in FIG. 1 in order to provide a force related to velocity pressure (Vp) which can act against the controller shown in FIG. 2; and, FIG. 5 shows an alternative method for deriving the force related to velocity pressure.
Figure 4:
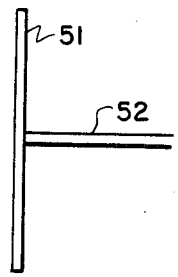

The rebalancing force supplied by the velocity pressure and acting upon movable contact 31 in opposition to the force exerted upon movable contact 31 by leaf spring 29 may be generated by target 51 such as that shown in FIG. 3. This target is inserted as the velocity pressure sensor 41 and drives through linkage 52 and the linkage 42 shown in FIG. 2.

Figure 5:
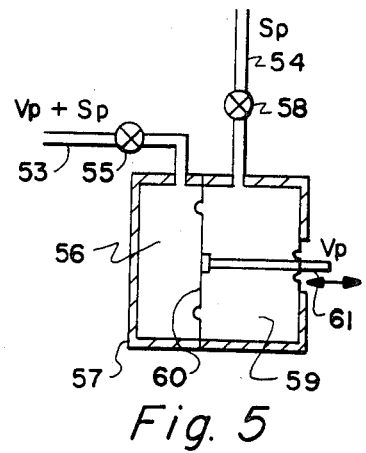

Alternatively, as shown in FIG. 5, the velocity pressure sensor 41 can take the form of a pitot tube arrangement comprising total pressure tube 53 for sensing both velocity pressure and static pressure and static pressure sensing tube 54, both tubes being mounted within duct 11. Total pressure tube 53 is connected through restriction 55 to total pressure chamber 56 of pneumatic control device 57. Static pressure sensing tube 54 is connected through restriction 58 to static pressure chamber 59 of controller 57. The pressure within chamber 56 exerts a force against diaphragm 60 which is related to velocity pressure and static pressure. The pressure within chamber 59 exerts an opposite pressure against diaphragm 50 in response to the static pressure supplied to chamber 59. Controller 57 in essence subtracts the static pressure from the total pressure within chamber 56 to yield a velocity pressure output which is communicated by rod 61 to rod 42 shown in FIG. 2.

An adjustable preload spring 71 is included in FIG. 2 for applying a very light spring force to movable contact 31 to insure close off between movable contact 31 and stationary contacts 32 and 33.

Velocity pressure is related to the velocity of air moving across the sensor by a square root function. That is, while it may be desirable to measure velocity of the air moving through duct 11 directly and use it as a rebalancing force against movable contact 31, it is not always practical or economical to use such an air flow sensor. Velocity pressure sensors may be more practical in at least certain applications for measuring the velocity pressure of the air moving through the duct and applying that velocity pressure as a rebalancing force to the movable contact 31. However, since the velocity pressure is a nonlinear function, the control action may become nonlinear. To linearize the control action in response to this nonlinear condition, cam 21 as well as the geometrical shape and cross section of movable contact 31 may have profiles which are related to the square function between velocity pressure and velocity to yield a linear control action between the controller and the damper.

The embodiments of the invention in which an exclusive property or rights is claimed are defined as follows:

1. A system for providing modulated air flow control in response to an on-off thermostat comprising:
   an on-off thermostat;
   a self-returning, slow moving motor connected to said thermostat for moving in a first direction when said thermostat is on and in a second direction when said thermostat is off;
   damper motor means, separate from said self-returning, slow moving motor, adapted to drive a damper for controlling said air flow; and,
   controller means responsive to said self returning, slow moving motor and connected to said damper motor means for controlling said damper motor means to modulate said air flow in response to said on-off thermostat.

2. The system of claim 1 wherein said controller means comprises a cam driven by said self-returning, slow moving motor, and switch means responsive to said cam for energizing and deenergizing said damper motor means in response to movement of said cam.

3. The system of claim 2 wherein said switch means comprises a movable switch contact which moves in response to movement of said cam which in turn moves in response to said self-returning, slow moving motor, a first stationary contact responsive to movement of said movable switch contact in a first direction for energizing said damper motor means to drive said damper in a first direction, and a second stationary contact responsive to movement of said movable switch contact in a second direction for energizing said damper motor means to drive said damper in a second direction.

4. The system of claim 3 wherein said controller means comprises maximum and minimum limit means for limiting the extent of movement of said cam in response to said self-returning, slow moving motor.

5. A system for providing modulated air flow control in response to an on-off thermostat comprising:
   an on-off thermostat;
   a self-returning, slow moving motor connected to said thermostat for moving in a first direction when said thermostat is on and in a second direction when said thermostat is off;
   damper motor means, separate from said self-returning, slow moving motor, adapted to drive a damper;
   air flow sensing means for sensing said air flow; and,
   controller means driven by said self-returning slow moving motor and connected to said damper motor means for controlling said damper motor means to drive said damper in a first direction when said self-returning, slow moving motor has moved a first sufficient amount in its first direction and to drive said damper in a second direction when said self-returning, slow moving motor has moved a second sufficient amount in its second direction to modulate said air flow in response to said on-off thermostat, said controller means also being responsive to said air flow sensor means for rebalancing said controller means in responses to changes in air flow resulting from movement of said damper motor means, said sufficient amounts being dependent upon said air flow sensor.

6. The system of claim 5 wherein said controller means comprises a cam driven by said self-returning, slow moving motor, and switch means responsive to said cam for energizing and deenergizing said damper motor means in response to movement of said cam.

7. The system of claim 6 wherein said switch means comprises a movable switch contact which moves in response to movement of said cam which in turn moves in response to said self-returning, slow moving motor, a first stationary contact responsive to movement of said movable switch contact in a first direction for energizing said damper motor means to drive said damper in a first direction, and a second stationary contact responsive to movement of said movable switch contact in a second direction for energizing said damper motor means to drive said damper in a second direction, said sufficient amounts being dependent upon spacings between said first and second stationary contacts.

8. The system of claim 7 wherein said controller means comprises maximum and minimum limit means for limiting the extent of movement of said cam in response to said self-returning, slow moving motor.

9. The system of claim 5 wherein said air flow sensor means comprises velocity pressure means for sensing the velocity pressure of said air flow.

10. The system of claim 9 wherein said controller means comprises a cam driven by said self-returning, slow moving motor, and switch means responsive to said cam for energizing and deenergizing said damper motor means in response to movement of said cam.

11. The system of claim 10 wherein said switch means comprises a movable switch contact which moves in response to movement of said cam which in turn moves in response to said self-returning, slow moving motor, a first stationary contact responsive to movement of said movable switch contact in a first direction for energizing said damper motor means to drive said damper in a first direction, and a second stationary contact responsive to movement of said movable switch contact in a second direction for energizing said damper motor means to drive said damper in a second direction, said sufficient amounts being dependent upon spacings between said first and second stationary contacts.

12. The system of claim 11 wherein said cam is configured to linearize the output of said velocity pressure sensor means.

13. The system of claim 12 wherein said controller means comprises maximum and minimum limit means for limiting the extent of movement of said cam in response to said self-returning, slow moving motor.

14. A system for providing modulated air flow control in response to an on-off thermostat comprising:
an on-off thermostat;
a self-returning, slow moving motor connected to said thermostat for being driven in a first direction when said thermostat is closed and in a second direction when said thermostat is open;
a cam driven by said self-returning, slow moving motor for moving in a first direction when said motor moves in said first direction and for moving in a second direction when said self-returning, slow moving motor moves in said second direction;
a switch having a movable contact driven by a cam follower which moves in response to movement of said cam and first and second stationary contacts;
damper motor means connected to said first and second stationary contacts and to said movable contact for driving said damper in a first direction when said movable contact contacts said first stationary contact and for driving in a second direction when said movable contact contacts said second stationary contact, said damper motor means controlling said damper for modulating said air flow in response to said on-off thermostat; and,
air flow sensing means responsive to said air flow for providing a rebalancing force to said movable contact of said switch.

15. The system of claim 14 wherein said air flow sensor means comprises velocity pressure means for sensing the velocity pressure of said air flow.

16. The system of claim 15 wherein said cam is configured to linearize the output of said velocity pressure sensor means.

17. The system of claim 16 wherein said movable contact is configured to aid in linearizing the output of said velocity pressure sensor means.

18. The system of claim 12 wherein said movable contact is configured to aid in linearizing the output of said velocity pressure sensor means.

* * * * *